Aug. 29, 1939.  J. W. PARK  2,171,046
TOP CONSTRUCTION
Filed Jan. 17, 1938
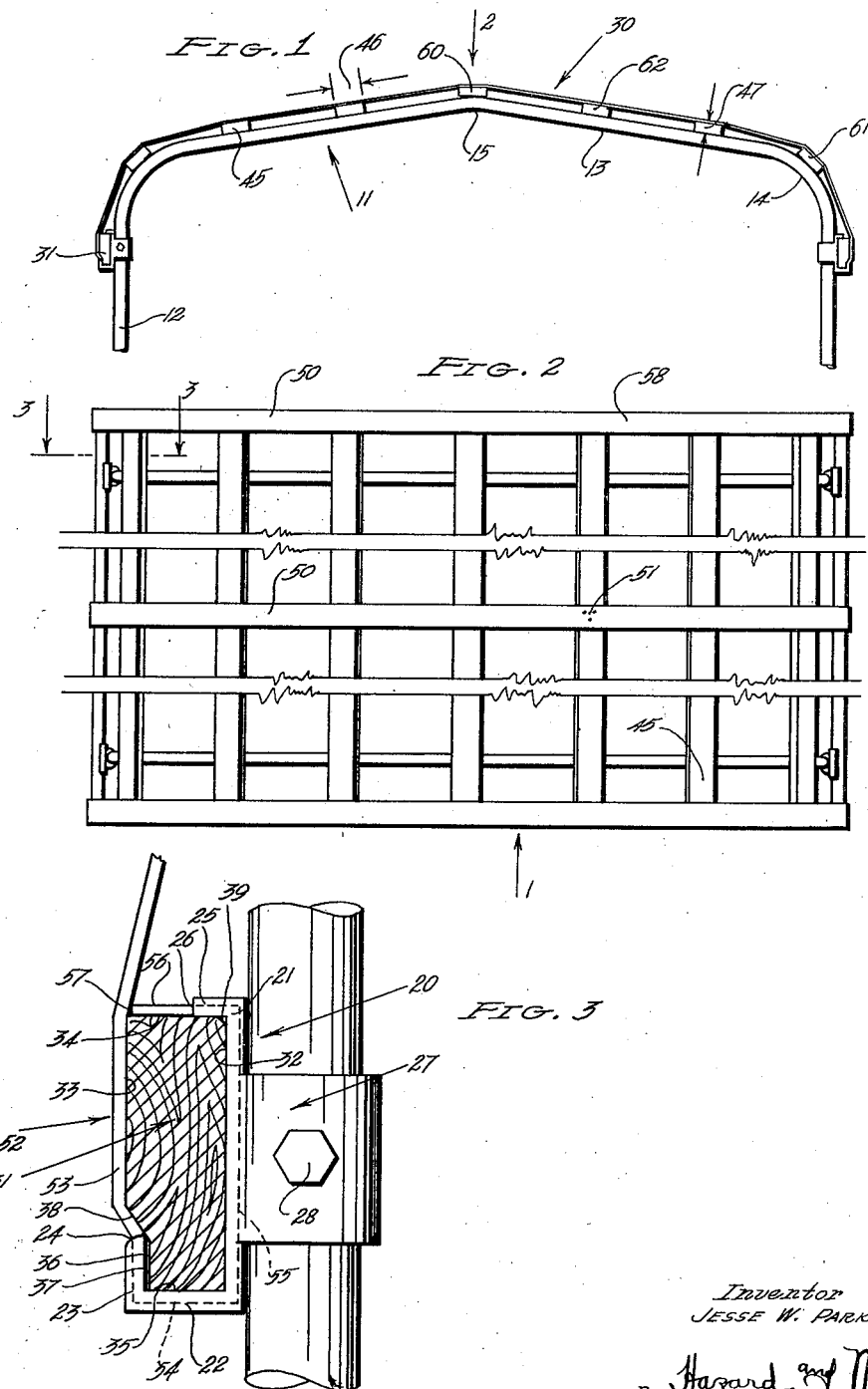
Inventor
JESSE W. PARK
By Hazard and Miller
Attorneys Patented Aug. 29, 1939

2,171,046

UNITED STATES PATENT OFFICE 2,171,046

TOP CONSTRUCTION

Jesse W. Park, Los Angeles, Calif.

Application January 17, 1938, Serial No. 185,375

3 Claims. (Cl. 296—104)

My invention relates to a top or cover construction for use with freight trucks and similar vehicles. My top construction is of a type intended to be used with a removable covering such as a canvas or tarpaulin which is drawn and stretched over a frame and then secured in any usual manner. In the usual constructions it is necessary to have quite an elaborate and rigid frame on the sides and over the top of the truck trailer or similar vehicle, this being sufficiently rigid and having either a sufficient number of cross and longitudinal supports to hold the canvas or tarpaulin in shape and over which it may be stretched. In many of these constructions a framing is used having bows, such bows having side members attached sometimes removably to the sides of the vehicle body and with an arch over the top together with longitudinal framing members connecting the bows.

An object and feature of my invention is to use a more or less standard bow construction as may now be used on vehicles and these may be readily removed to provide the vehicle with an open top where a large load is being carried or they may be removed for loading and unloading heavy articles. However in my construction an improvement is in securing on the outside of the vertical or upright part of the bows a channel type of holder or retaining element or device. These open outwardly and provide a means for retaining the top construction in place.

Such top construction includes a pair of substantial and strong longitudinal bars and a series of longitudinal straps, the bars and the straps preferably being made of wood and these are connected by fabric webbing, hence the removable top construction may be readily made into a roll for storage on the vehicle or other place and may likewise be readily unrolled and fitted to the bows by one person. The construction may be made sufficiently light even for a large vehicle to be readily handled by the driver of the vehicle.

Another detail feature of my invention relates to the interlocking construction of the channel type of holder secured to each bow and the two lower longitudinal bars, these being substantially rectangular except for having a cut-out notch on the lower face permitting the bars to be readily inserted and fitted in the channel brackets, thus when both of these bars, one on each side of the vehicle, is secured in the row of holders on the bows, the tension of the webbing retains the top construction in place on the bows and in such construction the straps or slats rest on the arched portion of the bows. A canvas or tarpaulin may then be readily stretched over the top and secured in any of the present and usual manners. My construction therefore provides a light yet strong construction for retaining the cover in the desired position and on account of the lightness and simplicity after removal of the convas, the top construction may readily be disconnected from the bows and made into a roll.

My invention is illustrated in connection with the accompanying drawing, in which:

Fig. 1 may be considered an end elevation taken in the direction of the arrow 1 of Fig. 2.

Fig. 2 is a plan taken in the direction of the arrow 2 of Fig. 1.

Fig. 3 is a detail vertical section at any of the bows taken for instance on the line 3—3 of Fig. 2 in the direction of the arrows.

My invention of the removable top construction is intended for use with standard type of bows designated generally by the numeral 11. These comprise a post section 12, and an arched top 13. The spring of the arch 14 may be considered as extending from the upper part of the vertical section of the posts and the crown 15 of the arch is in the mid-section. These bows may be made of wood either a single piece bent to shape or two or more pieces connected by splicing properly bent. In many cases however the bows are made of metal. My invention includes as one of its main features the brackets designated by the assembly numeral 20, each of which has a vertical web 21, a horizontal lower flange 22, a vertical rim 23 extending upwardly from the lower flange and parallel to the web. This is preferably provided with a bevel edge 24. A short upper flange 25 is formed integral with the web and the rest of the holder and may be considered as forming a shoulder abutment. This upper flange is at right angles to the web and thus parallel to the lower flange 22. It preferably terminates in a plane vertical edge 26.

The channel holders may be secured to the posts of the bows in any suitable manner, however, I have indicated a clamp 27 made in the form of a sleeve integral with the web portion 21. This is slipped over a cylindrical metal post and clamped in the desired position by a set screw 28.

The removable cover construction 30 employs two lower bars 31, each having the same characteristic and being made of wood. They are substantially rectangular, thus having a vertical inner face 32, a similar parallel outer face 33, an upper edge 34 and a lower edge 35. In the wood bars there is cut a longitudinal rabbet or notch 36. This has a vertical face 37 and a bevel 38 extending outwardly to the outer face 33. The upper inside corner 39 is preferably slightly rounded.

The channel holders are attached to all of the bows on each side of the vehicle and must be in horizontal alignment on each side so that the lower longitudinal bars may be fitted in the channel holders. It will be noted that on account of having the rabbet or notch 36 cut in the lower portion of each of the bars that this portion may be inserted in the lower part of the channel holder between the web 21, the lower flange 22 and the vertical rim 23. The upper portion may then be fitted and pressed inwardly below the short upper flange 25, the bar then fitting as shown in Fig. 3.

A series of slats 45 rectangular in cross section and much longer in width indicated by the measurement 46 than by their heighth indicated by their measurement line 47, are of the same length as the bars 31. The slats and the bars are connected by strips of webbing 50. These may be formed of fabric or other suitable material. Crossing the slats on their top surface at right angles, the webbing is secured to each slat for screws, nails or other fasteners, indicated at 51. The outer and lower ends of the webbing indicated at 52, extend downwardly over the outside face 33 of the bars, follow the bevel 38 and fit snugly against the face 37, thence the webbing is wrapped around the lower edge 35 upwardly on the inside face 32 and extends partly across the upper edge 34. This thus presents the main wrapping portions 53, 54, 55 and 56, terminating at 57. This wrapped portion of the webbing is securely attached by tacks, screws or the like to each of the bars.

The bars and the slats are preferably cut square at their ends and the end webbing has its outer edge 58 aligned with the ends of the slats and the bars. It will be noted that the ends of the webbing are wrapped around and secured to the bars at positions to be spaced between the bows and hence the webbing does not come in contact with the channel holders 20. The number of webs to be used of course depends on the distance apart of the bows on the vehicle and the slats and bars preferably project some little distance forward of the front bow and rearwardly of the rear bow. It will be noted that a comparatively few number of slats are necessary, however it is preferable to have a center slat 60 of the assembly directly over the crown 15 of the bow, to have the slats 61 nearest the bars 31 engage on the outside of the spring of the arch 14 and there may be one or more slats 62 resting on the bows between those over the spring of the arch and the crown of the arch. The webbing when the bars are properly fitted in their holders and the slats rest snugly on the bows forms a straight line between the bars 31 and the first pair of slats 61 and also straight lines between any two contiguous slats, therefore the webbing does not quite conform to the arched shape or curve of the bows. A purpose of having the rabbet or notch 36 in the lower parts of the bars 31 is so that the outer face 33 practically aligns with the outer face of the vertical rim 23, hence when a canvas or tarpaulin is fitted over the top construction and drawn tight by ropes or other fasteners in the ordinary manner, there is a smooth fit over the outside face 33 of the bars and the vertical rim 23 of the channel holders 20. In the illustrations the web is shown exaggerated as to thickness but on account of these webs being positioned intermediate the bows, the canvas or tarpaulin fits snugly over these. Also on account of the web edge 58 being in alignment with the ends of the slats and the bars, the canvas or tarpaulin cover is protected from contacting directly against the sharp edge of the bars and slats.

The manner of fitting the removable cover is as follows: This cover may be made into a roll by winding the webbing around one of the bars, then as the winding continues the slats are wound into a bundle and retained by the webbing until all the slats with the webbing are made into a roll, the winding terminating at the second bar. Therefore in fitting the removable cover to the bows the operator, usually the driver of the truck, can readily lift the roll to rest on the top of the arch. He can then unroll this until he has one of the bars aligned with a series of holder channels 20, one of which is secured preferably to the outside of each bow by suitable fasteners, the holders thus being in longitudinal alignment on each side of the vehicle. The lower end 35 is fitted in the bottom of a channel, that is, between the web 21, the bottom flange 22 and the rim 23. The rabbet 36 allows this as there is a slight loose fit. The slight rounded corner 39 permits the bar to be thrust downwardly and to fit snugly under the upper flange 25. This procedure thus securely attaches one of the longitudinal bars to the series of holders. The cover is then completely unrolled so that the other bar aligns with the row of holders on the opposite posts. It will be noted that the open side of each channel faces outwardly. The webbing is then stretched to fit this second bar in its series of holders in the same manner as the first bar, the upper edge 34 of the bar fitting snugly underneath the narrow upper flange 25. The bars should be slightly less in measurement between the upper edge 34 and the lower edge 35 than the distance between the lower flange 22 and the upper narrow flange 25. On account of the rabbet 36, there should also be a slight clearance between the inside vertical face 32 of the bar and the outer face 37 of the rabbet. This gives a somewhat loose fit of the bar in the channel, however when the web is taut after being stretched to fit the bars in place in the holders, the bars are pulled upwardly so that their upper faces 34 contact the abutment shoulder of the narrow flange 25, along the upper edge of each channel holder. This engagement is sufficient to retain both of the bars in place in the holders and the straps positioned over the arch of the bows. The webbing is thus spaced from the bows by the thickness of the slats. Of course the webbing between adjacent pairs of straps will be in a straight line whereas the bows are arched but when using a considerable number of slats, the webbing will conform approximately to the arch of the bows. Canvas tarpaulin or other fabric or similar covering may then be spread over the removable top construction and secured to the vehicle or to the posts of the bows in any usual and known manner. This construction is relatively light and yet may be sufficiently strong for the purpose of supporting canvas or similar outer coverings. Manifestly the top construction may be removed after unfastening the outer fabric cover, removing this, unhooking one of the bars from its set of holder channels and then rolling the top with the bars and slats into a roll. This leaves the bows entirely exposed so that if desired these can be entirely removed from the vehicle as is quite customary where it is desired to have the truck open at the top or unobstructed for loading and unloading heavy articles on or off the truck.

Various changes may be made in the details of the construction without departing from the spirit or scope of the invention as defined by the appended claims.

I claim:

1. In a device as described, a metal bracket channel shaped in vertical cross section and including a web, an upper and a lower flange, a rim extending upwardly from the lower flange parallel to the web, the upper flange being of less length than the lower flange and a clamp connected to the web adapted for attachment to a bow, the said channel being open opposite the web between the upper edge of the rim and the outer edge of the upper flange.

2. In a device as described, a metal bracket channel shaped in vertical transverse section and characterized by a vertical web, a lower horizontal flange, a vertical rim extending upwardly from the outer end of the lower flange and parallel to the web, an upper horizontal flange at the upper end of the web of less length than the lower flange, means for attaching the holder to a bow, the said channel being open opposite the web between the upper edge of the rim and the outer edge of the upper flange and adapted for insertion and removal of a horizontal bar rigid in its cross section and shaped to fit the channel.

3. In a device as described, the combination of a metal bracket channel shaped in vertical transverse section including a vertical web, an upper and a lower flange, a rim extending upwardly from the lower flange parallel to the web, the upper flange being of less length than the lower flange, means for attaching the web to a bow with the channel facing outwardly, a horizontal bar rigid in cross section and having an inside vertical face, a lower and an outer edge to fit against the lower flange and the rim and an upper surface to fit underneath the upper flange and a tension member secured to the bar to exert an upward reaction of the bar against the upper flange and thereby retain the bar from displacement.

JESSE W. PARK.